(12) United States Patent
Xie et al.

(10) Patent No.: US 10,509,509 B2
(45) Date of Patent: Dec. 17, 2019

(54) SUBSTRATE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xiaodong Xie, Beijing (CN); Ming Zhang, Beijing (CN); Ming Hu, Beijing (CN); Jing Wang, Beijing (CN); Yu Zhu, Beijing (CN); Yuan Li, Beijing (CN)

(73) Assignees: BOE TECHNOLOGY GROUP CO., LTD., Beijing (CN); HEFIE XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 38 days.

(21) Appl. No.: 15/753,639

(22) PCT Filed: Feb. 16, 2017

(86) PCT No.: PCT/CN2017/073766
§ 371 (c)(1),
(2) Date: Feb. 20, 2018

(87) PCT Pub. No.: WO2017/202067
PCT Pub. Date: Nov. 30, 2017

(65) Prior Publication Data
US 2018/0246613 A1     Aug. 30, 2018

(30) Foreign Application Priority Data
May 27, 2016  (CN) .......................... 2016 1 0366300

(51) Int. Cl.
G06F 3/041      (2006.01)
G06F 3/044      (2006.01)
(Continued)

(52) U.S. Cl.
CPC ............ G06F 3/0416 (2013.01); G06F 3/044 (2013.01); *B32B 7/12* (2013.01); *B32B 17/06* (2013.01);
(Continued)

(58) Field of Classification Search
CPC combination set(s) only.
See application file for complete search history.

(56) References Cited

U.S. PATENT DOCUMENTS

2011/0048914 A1    3/2011  Hsu
2012/0154326 A1    6/2012  Liu
(Continued)

FOREIGN PATENT DOCUMENTS

CN      103049130 A      4/2013
CN      104793820 A      7/2015
(Continued)

OTHER PUBLICATIONS

First Office Action for Chinese Patent Application No. 201610366300.0 dated Mar. 19, 2018.
(Continued)

*Primary Examiner* — Van N Chow
(74) *Attorney, Agent, or Firm* — Calfee, Halter & Griswold LLP (57) ABSTRACT

A substrate and a display device are disclosed. The substrate includes at least one main signal line. Each of the at least one main signal line includes a plurality of sub signal lines connected in parallel with one another. By arranging a plurality of sub signal lines connected in parallel with one another in the main signal line, the resistance of the main signal line can be reduced effectively, which is favorable to improving uniformity for the channel resistances of the touch screen.

16 Claims, 6 Drawing Sheets

(51) Int. Cl.
    *B32B 7/12*       (2006.01)
    *B32B 17/06*      (2006.01)
(52) U.S. Cl.
    CPC .................. *B32B 2457/208* (2013.01); *G06F 2203/04103* (2013.01)

(56)         References Cited

U.S. PATENT DOCUMENTS

2016/0313844 A1* 10/2016 Chen .................. G06F 3/0416
2016/0328070 A1* 11/2016 Lin ..................... G06F 3/0416
2017/0052615 A1   2/2017 Cao

FOREIGN PATENT DOCUMENTS

CN          104808858 A     7/2015
CN          105159489 A    12/2015
CN          205247353 U     5/2016
CN          105912182 A     8/2016
CN          205680075 U    11/2016
JP         2001125724 A     5/2001

OTHER PUBLICATIONS

Search Report for International Patent Application No. PCT/CN2017/073766 dated Apr. 27, 2017.

* cited by examiner

SUBSTRATE AND DISPLAY DEVICE

CROSS REFERENCE TO RELATED APPLICATION

This application is the U.S. national phase entry of PCT/CN2017/073766, with an international filling date of Feb. 16, 2017, which claims priority to the patent application No. 201610366300.0 filed with the Patent Office of the People's Republic of China on May 27, 2016, the disclosure of which is entirely incorporated herein by reference.

TECHNICAL FIELD

This disclosure relates to the field of display, particularly to a substrate and a display device.

BACKGROUND

Figure 1:
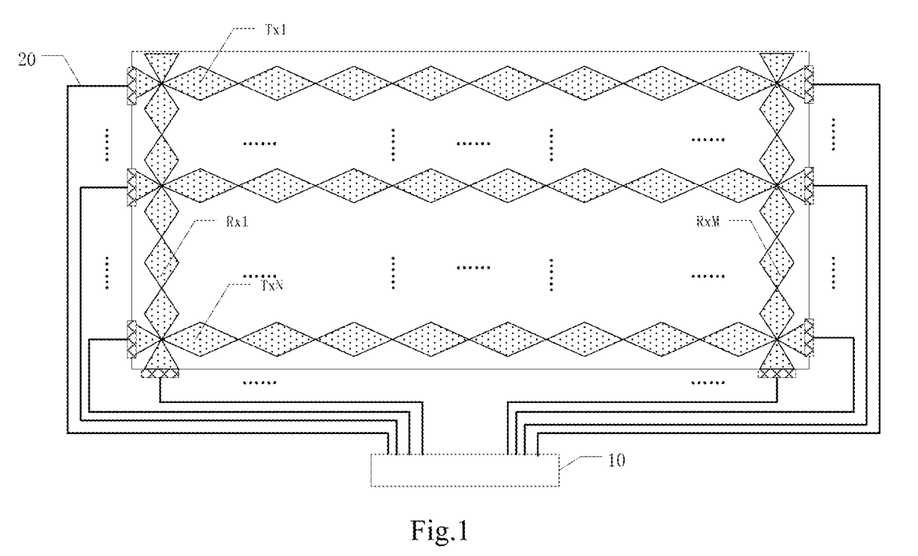
FIG. 1 is a schematic view of a conventional touch screen.

With the rapid development of display technology, the touch screen has gone deep into people's life. As shown in FIG. 1, the touch control structure of the current touch screen generally comprises a base substrate and a touch pattern. The touch pattern is composed of touch electrodes. The touch electrodes include touch driving electrodes (Tx) and touch sensing electrodes (Rx). These touch electrodes are connected to a touch driving circuit through signal lines (wirings). For example, as shown in FIG. 1, each of the two terminals of each touch driving electrode Tx is connected with the touch driving circuit 10 through a signal line 20. However, because the distances from the touch electrodes to the touch driving circuit are different, the lengths of the signal lines for different touch electrodes are also different, thereby resulting in differences in the channel resistances of different channels (each channel includes one touch electrode and a signal line connecting the touch electrode with the touch driving circuit) of the touch screen.

With the development of the touch screen technology, people have higher and higher requirements on the performance of the touch screen. Therefore, the touch screen also has more and more functions, such as floating touch, waterproofing function, active pen support, passive pen support, etc. With the increase of the functions of the touch screen, more requirements are also put forward to the design of the touch screen. One of the most significant requirements is exactly improvement on uniformity of the channel resistance of the touch screen.

SUMMARY

Therefore, it is desired to improve uniformity of the channel resistance for the touch screen.

In an aspect, the technical solution of an embodiment of this disclosure provides a substrate comprising at least one main signal line, each main signal line comprising a plurality of sub signal lines connected in parallel with one another.

According to another embodiment, the substrate further comprises a touch driving circuit and a plurality of touch electrodes, at least one of the plurality of touch electrodes is connected with the touch driving circuit through the main signal line.

According to another embodiment, each of the at least one main signal line comprises a first segment and a second segment connected in series with the first segment, the second segment comprising a plurality of sub signal lines connected in parallel with one another.

According to another embodiment, each of the at least one main signal line comprises a plurality of second segments connected in series with one another.

According to another embodiment, for any two adjacent second segments in each main signal line, the second segment away from the touch driving circuit has more sub signal lines than the second segment close to the touch driving circuit.

According to another embodiment, for any two adjacent second segments in each main signal line, the second segment away from the touch driving circuit has two times as many sub signal lines as the second segment close to the touch driving circuit.

According to another embodiment, the plurality of touch electrodes comprises a plurality of touch driving electrodes, each touch driving electrode being connected with the touch driving circuit through at least one main signal line.

According to another embodiment, for any two main signal lines connecting different touch driving electrodes, the main signal line for connecting the touch driving electrode away from the touch driving circuit has more sub signal lines than the main signal line for connecting the touch driving electrode close to the touch driving circuit.

According to another embodiment, the plurality of touch driving electrodes are divided into at least two groups of touch driving electrodes, any two main signal lines for connecting different touch driving electrodes in a same group have a same number of sub signal lines, and for any two main signal lines for connecting different touch driving electrodes in different groups, the main signal line for connecting the touch driving electrode away from the touch driving circuit has more sub signal lines than the main signal line for connecting the touch driving electrode close to the touch driving circuit.

According to another embodiment, each of two terminals of each touch driving electrode is connected with the touch driving circuit through one main signal line.

According to another embodiment, the plurality of touch electrodes a plurality of touch sensing electrodes, each touch sensing electrode being connected with the touch driving circuit through at least one main signal line.

According to another embodiment, for any two main signal lines connecting different touch sensing electrodes, the main signal line for connecting a touch sensing electrode away from the touch driving circuit has more sub signal lines than the main signal line for connecting a touch sensing electrode close to the touch driving circuit.

According to another embodiment, the plurality of touch sensing electrodes are divided into at least two groups of touch sensing electrodes, for any two main signal lines for connecting different touch sensing electrodes in a same group have a same number of sub signal lines, and for any two main signal lines for connecting different touch sensing electrodes in different groups, the main signal line for connecting the touch sensing electrode away from the touch driving circuit has more sub signal lines than the main signal line for connecting the touch sensing electrode close to the touch driving circuit.

According to another embodiment, each sub signal line has a width of about 8 μm-30 μm.

According to another embodiment, the substrate further comprises a base substrate, as well as a light shielding layer, a bridging layer, a first cover layer, a transparent conductive layer, a metal layer and a second cover layer arranged on the base substrate successively, wherein the transparent conductive layer comprises the plurality of touch electrodes, and the metal layer comprises the main signal lines.

In another aspect, an embodiment of this disclosure further provides a display device comprising the above substrate.

DETAILED DESCRIPTION OF EMBODIMENTS

Next, specific embodiments in this disclosure will be described in more details in conjunction with the accompanying drawings and the examples. The following embodiments are used for explaining this disclosure, instead of limiting the scope of the invention.

An embodiment of this disclosure provides a substrate, comprising at least one main signal line, each of which comprises a plurality of sub signal lines connected in parallel with one another.

By arranging a plurality of sub signal lines connected in parallel with one another in the main signal line, the resistance of the main signal line can be reduced effectively, which is favorable to improving uniformity of the channel resistance of the touch screen.

The substrate in the embodiment of the disclosure can be a touch screen, such as a capacitive touch screen. The substrate may further comprise a touch driving circuit and a plurality of touch electrodes. At least one of the plurality of touch electrodes is connected with the touch driving circuit through at least one main signal line. Each of the at least one main signal line comprises a plurality of sub signal lines connected in parallel with one another.

The plurality of touch electrodes may comprise a plurality of touch driving electrodes. For example, in order to improve the uniformity of the channel resistance for the touch driving electrodes in the touch screen, the plurality of touch driving electrodes in the touch screen can be connected with the touch driving circuit using the above main signal line. According to an embodiment of this disclosure, each of the plurality of touch driving electrodes is connected with the touch driving circuit through at least one main signal line.

Figure 2:
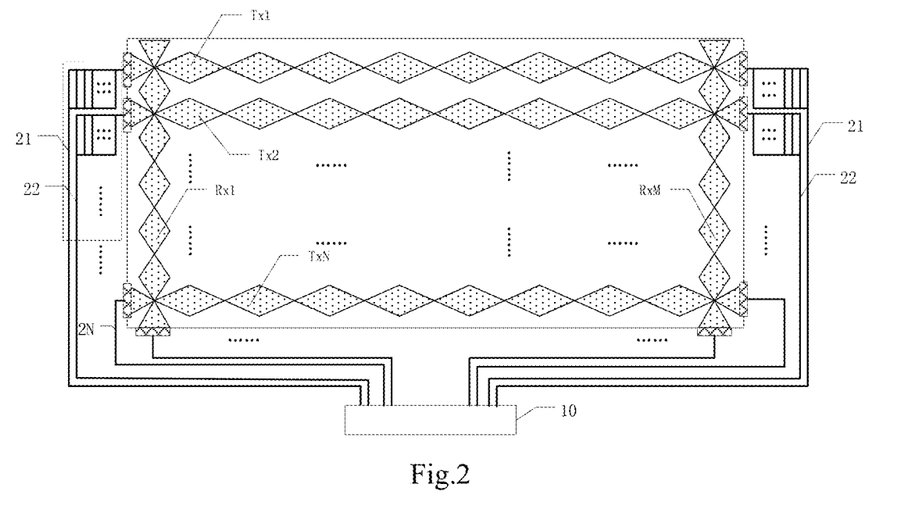
FIG. 2 is a schematic view of a substrate (touch screen) provided by an embodiment of this disclosure.

Referring to FIG. 2, which is a schematic view of a substrate (e.g., touch screen) provided by an embodiment of this disclosure. The substrate comprises N (which is greater than 3) touch driving electrodes (Tx1, Tx2, . . . , TxN) and M (which is greater than 3) touch sensing electrodes (Rx1, Rx2, . . . , RxM).

In order to improve the uniformity of channel resistances of the touch driving electrodes in the touch screen, a plurality of touch driving electrodes in the N touch driving electrodes may be connected with the touch driving circuit 10 through a plurality of main signal lines respectively, each main signal line comprising a plurality of sub signal lines connected in parallel with one another.

For example, as shown in FIG. 2, as compared to the touch driving electrode TxN, the touch driving electrodes Tx1, Tx2, . . . , Tx(N−1) are relatively far from the touch driving circuit 10, hence, each of the two terminals of each touch driving electrode in the touch driving electrodes Tx1, Tx2, . . . , Tx(N−1) can be connected with the touch driving circuit 10 through one main signal line. For example, as shown in FIG. 2, each of the two terminals of the touch driving electrode Tx1 is connected with the touch driving circuit 10 through a main signal line 21, and each of the two terminals of the touch driving electrode Tx2 is connected with the touch driving circuit 10 through a main signal line 22.

Figure 3:
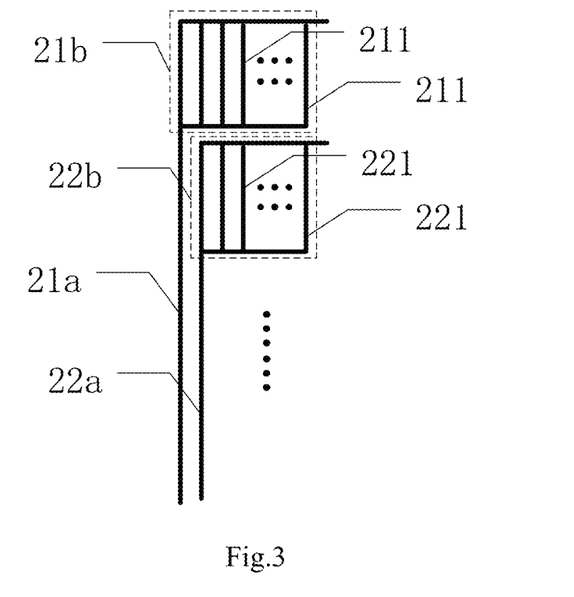
FIG. 3 is an enlarged schematic view of the dotted block in FIG. 2.

Each main signal line comprises a first segment and a second segment connected in series with the first segment. The second segment comprises a plurality of sub signal lines connected in parallel with one another. For example, referring to FIG. 3, which is an enlarged schematic view of the dotted block shown in FIG. 2. The main signal line 21 for connecting the touch driving electrode Tx1 with the touch driving circuit 10 comprises a first segment 21a and a second segment 21b connected in series with the first segment 21a. The first segment 21a can be a single metal line as shown in FIG. 3, and the second segment 21b comprises a plurality of sub signal lines 211 connected in parallel with one another. The main signal line 22 for connecting the touch driving electrode Tx2 with the touch driving circuit 10 comprises a first segment 22a and a second segment 22b connected in series with the first segment 22a. The first segment 22a can be a single metal line as shown in FIG. 3, and the second segment 22b comprises a plurality of sub signal lines 221 connected in parallel with one another. By means of the above main signal lines, the resistance of the signal line can be reduced, which is favorable to improving uniformity of the channel resistance of the touch screen. The width of each sub signal line can be about 8 µm-30 µm, e.g., 20 µm.

In addition, as the distances between the touch driving electrodes Tx1, Tx2, . . . , Tx(N−1) and the touch driving circuit 10 are different, the lengths of the signal lines for different touch driving electrode are also different. In order to further improve the uniformity of the channel resistances for the touch driving electrodes, the number of the sub signal lines in the main signal line can be set based on the distance between the touch driving electrode and the touch driving circuit 10. For example, in the above substrate (touch screen), as for any two main signal lines connecting different touch driving electrodes, the number of sub signal lines comprised in the main signal line for connecting the touch driving electrode away from the touch driving circuit is larger than the number of sub signal lines comprised in the main signal line for connecting the touch driving electrode close to the touch driving circuit. As an example, as for two adjacent touch driving electrodes, the main signal line used for the touch driving electrode away from the touch driving circuit may have one more sub signal lines than the main signal line used for the touch driving electrode close to the touch driving circuit has. In this way, the problem of non-uniformity of the channel resistances of the touch screen caused by different distances between different touch driving electrodes and the touch driving circuit can be further mitigated or avoided.

In addition, in order to reduce the manufacture difficulty and increase the yield rate, the touch driving electrodes in the touch screen can be divided into groups. The touch driving electrodes all may be divided into at least two groups of touch driving electrodes. As for any two main signal lines connecting different touch driving electrodes in the same group, they may have the same number of the sub signal lines. As for any two main signal lines connecting different touch driving electrodes in different groups, the number of sub signal lines comprised in the main signal line for connecting the touch driving electrode away from the touch driving circuit is larger than the number of sub signal lines comprised in the main signal line for connecting the touch driving electrode close to the touch driving circuit.

Taking a touch screen having 36 (i.e., N=36) touch driving electrodes Tx1, Tx2, . . . , Tx36 as an example, the touch driving electrodes can be arranged successively in the direction from top to bottom, and the touch driving circuit can be disposed at a middle position below the touch screen. The touch driving electrodes Tx1, Tx2, . . . , Tx35 can be divided into three groups, i.e., a first group of touch driving electrodes including twelve touch driving electrodes of Tx1, Tx2, . . . , Tx12, a second group of touch driving electrodes including twelve touch driving electrodes of Tx13, Tx14, . . . , Tx24, and a third group of touch driving electrodes including eleven touch driving electrodes of Tx25, Tx26, . . . , Tx35. Each main signal line used for the touch driving electrode in the first group of touch driving electrodes can comprise 6-8 sub signal lines, each main signal line used for the touch driving electrode in the second group of touch driving electrodes can comprise 3-5 sub signal lines, and each main signal line used for the touch driving electrode in the third group of touch driving electrodes can comprise 2 sub signal lines. However, the signal line used for the touch driving electrode Tx36 may be designed in a conventional way as it is closest to the touch driving circuit. With the structure described above, it may not only improve the uniformity of the channel resistances for the touch driving electrodes of the touch screen, but also can reduce the difficulty of the manufacturing process and increase the yield rate.

According to another embodiment, in order to further reduce the resistance of the main signal line and improve the uniformity of the channel resistances for the touch screen, each main signal line can comprise a plurality of second segments connected in series with one another.

Figure 4:
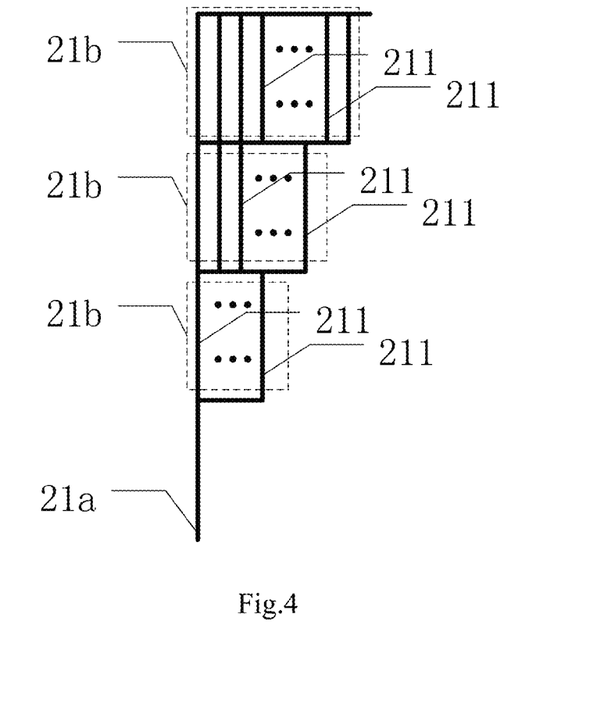
FIG. 4 is a schematic view of a main signal line provided by an embodiment of this disclosure.

For example, referring to FIG. 4, the main signal line comprises a plurality of second segments 21b connected in series with one another, and as for any two adjacent second segments 21b in the main signal line, the number of sub signal lines comprised by the second segment away from the touch driving circuit is larger than the number of sub signal lines comprised by the second segment close to the touch driving circuit.

Figure 5:
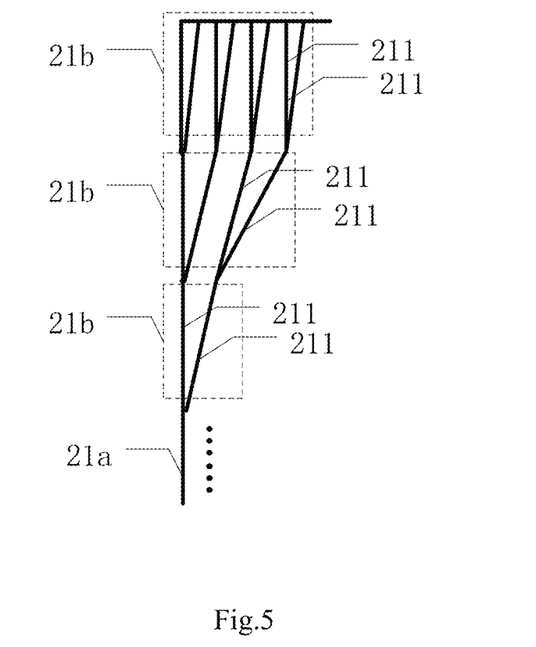
FIG. 5 is a schematic view of main signal line provided by another embodiment of this disclosure.

As an example, for any two adjacent second segments in each main signal line, the number of sub signal lines comprised in the second segment away from the touch driving circuit is twice of the number of sub signal lines comprised in the second segment close to the touch driving circuit. For example, the structure of the main signal line may be as shown in FIG. 5.

In addition, in order to improve uniformity of the channel resistances for the touch sensing electrodes in the touch screen, the main signal line as described above can be applied to the plurality of touch sensing electrodes in the touch screen. Each of the plurality of touch sensing electrodes is connected with the touch driving circuit through at least one main signal line.

Figure 6:
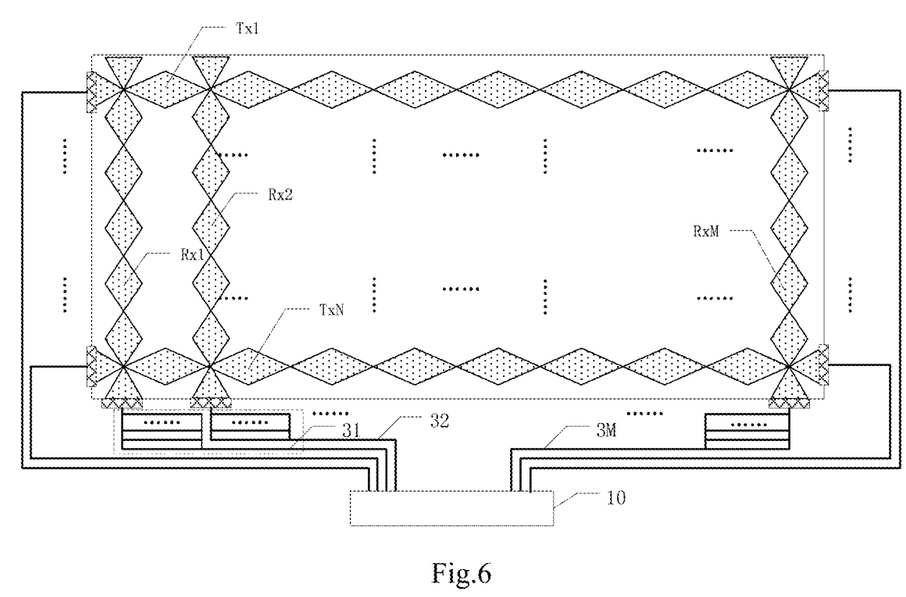
FIG. 6 is a schematic view of substrate (touch screen) provided by another embodiment of this disclosure.

Referring to FIG. 6, which is a schematic view of substrate (touch screen) provided by another embodiment of this disclosure. The substrate comprises N (N is greater than 3) touch driving electrodes (Tx1, Tx2, . . . , TxN) and M (M is greater than 3) touch sensing electrodes (Rx1, Rx2, . . . , RxM).

In order to improve uniformity of the channel resistances for the touch sensing electrodes in the touch screen, a plurality of touch sensing electrodes in the M touch sensing electrodes can be connected with the touch driving circuit 10 through a plurality of main signal lines respectively. Each of the plurality of main signal lines comprises a plurality of sub signal lines connected in parallel with one another.

For example, as shown in FIG. 6, because the touch sensing electrodes located at two side areas of the touch screen are farther from the touch driving circuit 10 than the touch sensing electrodes located in the middle area of the touch screen, each of the plurality of touch sensing electrodes located in the two side areas of the touch screen can be connected with the touch driving circuit 10 through one main signal line respectively. For example, as shown in FIG. 6, the touch sensing electrode Rx1 is connected with the touch driving circuit 10 through a main signal line 31, and the touch sensing electrode Rx2 is connected with the touch driving circuit 10 through a main signal line 32.

Figure 7:
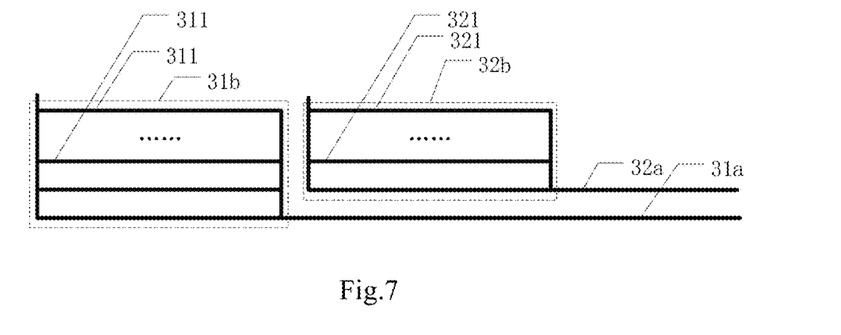
FIG. 7 is an enlarged schematic view of the dotted block in FIG. 6.

Each main signal line comprises a first segment and a second segment connected in series with the first segment. The second segment comprises a plurality of sub signal lines connected in parallel with one another. For example, referring to FIG. 7, which is an enlarged schematic view of the dotted block in FIG. 6, the main signal line 31 for connecting the touch sensing electrode Rx1 with the touch driving circuit 10 comprises a first segment 31a and a second segment 31b connected in series with the first segment 31a. The first segment 31a can be a single metal line as shown in FIG. 7, and the second segment 31b comprises a plurality of sub signal lines 311 connected in parallel with one another. The main signal line 32 for connecting the touch sensing electrode Rx2 with the touch driving circuit 10 comprises a first segment 32a and a second segment 32b connected in series with the first segment 32a. The first segment 32a can be a single metal line as shown in FIG. 7, and the second segment 32b comprises a plurality of sub signal lines 321 connected in parallel with one another. By means of the above main signal lines, the resistance of the signal line can be reduced, which is advantageous for improving uniformity of the channel resistances for the touch screen. The width of each sub signal line can be in the range of 8 μm-30 μm, e.g., 20 μm.

In order to further improve the uniformity of the channel resistances for the touch sensing electrode, the number of the sub signal lines in the main signal line can be set based on the distance between the touch sensing electrode and the touch driving circuit 10. For example, in the above touch screen, as for any two main signal lines connecting different touch sensing electrodes, the number of sub signal lines comprised in the main signal line for connecting the touch sensing electrode away from the touch driving circuit is larger than the number of sub signal lines comprised in the main signal line for connecting the touch sensing electrode close to the touch driving circuit. For example, as for two adjacent touch sensing electrodes, the main signal line used for the touch sensing electrode away from the touch driving circuit may have one more sub signal lines than the main signal line used for the touch sensing electrode close to the touch driving circuit has. In this way, the problem of non-uniformity of the channel resistances for the touch screen caused by different distances between different touch sensing electrodes and the touch driving circuit can be further mitigated or avoided.

In addition, in order to reduce the manufacture difficulty and increase the yield rate, the touch sensing electrodes in the touch screen can be divided into groups. All the touch sensing electrodes may comprise at least two groups of touch sensing electrodes. As for any two main signal lines connecting different touch sensing electrodes in the same group, they may have the same number of the sub signal lines. As for any two main signal lines connecting different touch sensing electrodes in different groups, the number of sub signal lines comprised in the main signal line for connecting the touch sensing electrode away from the touch driving circuit is larger than the number of sub signal lines comprised in the main signal line for connecting the touch sensing electrode close to the touch driving circuit.

For example, as for a touch screen having 64 (i.e., M=64) touch sensing electrodes Rx1, Rx2, . . . , Rx64, the touch sensing electrodes can be arranged successively in the direction from left to right. The touch driving circuit can be arranged at a middle position below the touch screen. The touch sensing electrodes Rx1, Rx2, . . . , Rx30 located in the left area of the display panel and the touch sensing electrodes Rx35, Rx36, . . . , Rx64 in the right area of the display panel may be divided into three groups. The first group of touch sensing electrodes includes twenty touch sensing electrodes of Rx1, Rx2, . . . , Tx10 and Rx55, Rx56, . . . , Rx64. The second group of touch sensing electrodes includes twenty touch sensing electrodes of Rx11, Rx12, . . . , Rx20 and Rx45, Rx46, . . . , Rx54. The third group of touch sensing electrodes includes twenty touch sensing electrodes of Rx21, Rx22, . . . , Rx30 and Rx35, Rx36, . . . , Rx44. Each main signal line used for each touch sensing electrode in the first group of touch sensing electrodes can comprise 6-8 sub signal lines. Each main signal line used for each touch sensing electrode in the second group of touch sensing electrodes can comprise 3-5 sub signal lines. Each main signal line used for each touch sensing electrode in the third group of touch sensing electrodes can comprise 2 sub signal lines. However, regarding the touch sensing electrodes Rx31, Rx32, . . . , Rx34 located in the middle area of the touch screen, which are closest to the touch driving circuit, they may be designed in a conventional way. With the structure as described above, it can not only improve the uniformity of the channel resistances for the touch sensing electrodes of the touch screen, but also can reduce the difficulty of the manufacturing process and increase the yield rate.

According to another embodiment, in order to further reduce the resistance of the main signal line and improve the uniformity of the channel resistances for the touch screen, each main signal line in the touch screen can comprise a plurality of second segments connected in series with one another.

According to another embodiment, as for any two adjacent second segments in each main signal line, the number of sub signal lines comprised by the second segment away from the touch driving circuit is larger than the number of sub signal lines comprised by the second segment close to the touch driving circuit.

As an example, as for any two adjacent second segments in each main signal line, the number of sub signal lines comprised by the second segment away from the touch driving circuit is twice of the number of sub signal lines comprised by the second segment close to the touch driving circuit.

The main signal line according to the embodiment of this disclosure is not only applicable in the touch screen with an ordinary frame, but also particularly applicable for the product with narrow frame. With the development of the narrow frame technology, the signal lines in the touch screen also become more and more thin, which will further intensify non-uniformity of the channel resistance for the touch screen. With the main signal line according to the embodiments of this disclosure, the adverse effect brought by signal line thinning and film sheet resistance change can be mitigated or avoided effectively, the adverse effect brought by signal line thinning to the uniformity of the channel resistance for the touch screen can be reduced, and the adhesive force of the signal lines can be increased so as to avoid peeling of the signal line.

Figure 8:
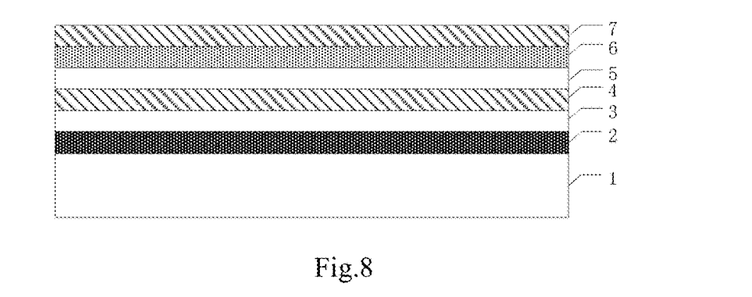
FIG. 8 is a schematic view of a substrate (touch screen) provided by yet another embodiment of this disclosure.

The touch screen provided by the embodiments of this disclosure can be a touch screen of any structure, such as a capacitive touch screen. For example, the touch screen provided by an embodiment of this disclosure can be a touch screen of an OGS (one glass solution) structure. Referring to FIG. 8, the touch screen comprises a base substrate 1 and a light shielding layer (e.g., black matrix (BM)) 2, a bridging layer (Bridge) 3, a first cover layer (OC1) 4, a transparent conductive layer 5, a metal layer 6 and a second cover layer (OC2) 7 arranged on the base substrate 1 successively. The transparent conductive layer 5 comprises a plurality of touch electrodes. The metal layer 6 comprises main signal lines for connecting the touch electrodes with the touch driving circuit.

The method for manufacturing the above touch screen of OGS structure may comprise the following steps.

Step 1: manufacturing the light shielding layer (BM) 2 on the base substrate (e.g., a glass substrate) 1. The process mainly includes gluing, exposing and developing, so as to form the BM layer with a desired pattern.

Step 2: manufacturing the bridging layer (e.g., an ITO bridge layer) 3. The main process includes coating ITO, coating photoresist, exposing, developing and etching, so as to form the desired bridging layer.

Step 3: manufacturing the first cover layer (OC1) 4. The main process includes gluing, exposing and developing, so as to form the first cover layer with a desired pattern.

Step 4: manufacturing the transparent conductive layer 5. The transparent conductive layer is manufactured according to a desired transparent conductive layer pattern (e.g., ITO pattern, i.e., touch pattern). The main process includes coating ITO, coating photoresist, exposing, developing and etching, so as to form the desired transparent conductive layer. In this step, corresponding channels for sensing pressure can also be formed.

Step 5: manufacturing the metal layer 6. The main process includes coating metal, coating photoresist, exposing, developing and etching, so as to form the desired metal layer 6.

Step 6: manufacturing the second cover layer (OC2) 7. The main process includes gluing, exposing and developing, so as to form the second cover layer with a desired pattern.

By connecting the touch electrodes with the touch driving circuit using the main signal lines according to the embodiment of this disclosure, the adverse effect brought by signal line thinning and sheet resistance change can be reduced effectively, and the uniformity of the channel resistances for the touch screen can be improved effectively.

For example, a test can be perform to a OGS touch screen having thirty-six touch driving electrodes, the size of the touch screen is 15.6 inch.

Figure 9:
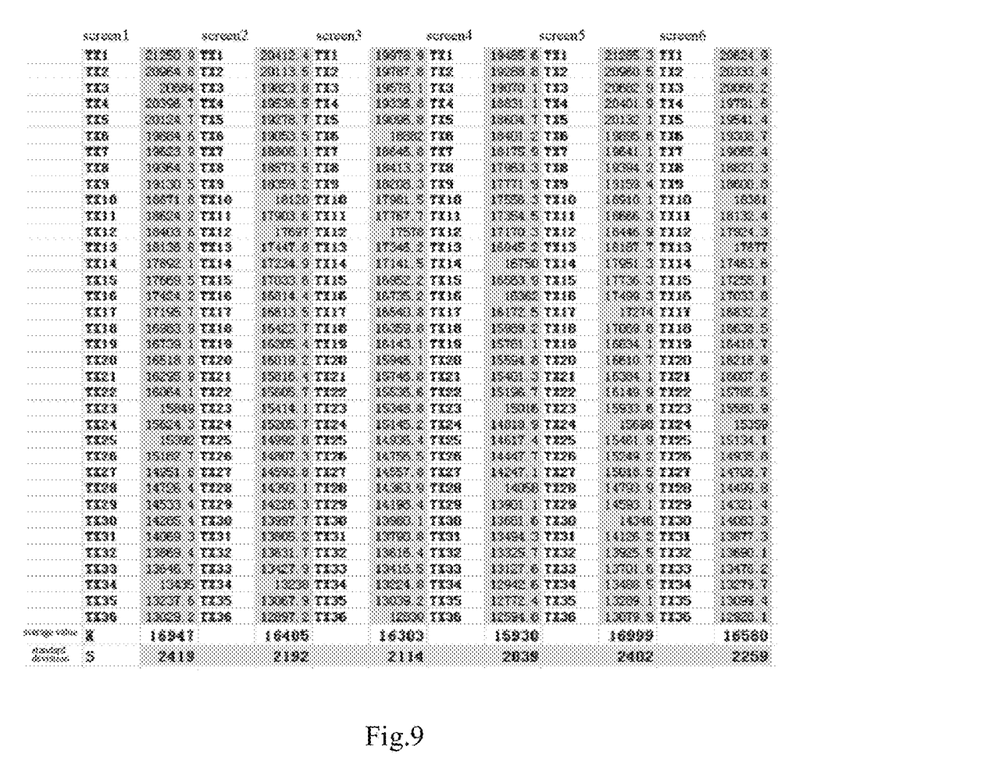
FIG. 9 is a schematic view of result of a test performed to the conventional touch screen.
Figure 10:
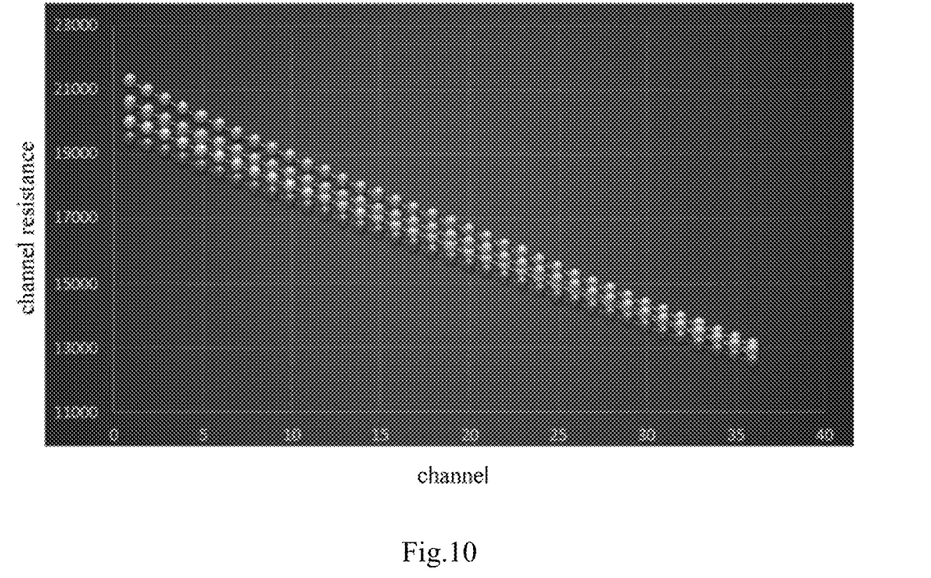
FIG. 10 is a representation diagram of data in FIG. 9.

Firstly, a test is performed to the touch screen of a conventional structure (i.e., the structure in FIG. 1). The channel resistances of the touch driving electrodes for six touch screens (screen 1-screen 6) are detected and analyzed, the results thereof are shown in FIG. 9 and FIG. 10. As for the structure in FIG. 1, because touch driving electrode Tx1 is farthest from the touch driving circuit, the channel resistance of the first channel where the Tx1 locates would be rendered maximum. There is a very large difference between the channel resistance of the first channel where the touch driving electrode Tx1 locates and the channel resistance of the $36^{th}$ channel where the touch driving electrode Tx36 locates. Thus, there exists a great difference between the channel resistances of different channels. From the data as shown in FIG. 9 and the curve in FIG. 10, it can be seen that the difference between the maximum value and the minimum value of the channel resistances in the same touch screen is about 38.7%. Moreover, the standard deviation for each of the touch screens is greater than 1000. It shows that the channel resistances of the touch screen of a conventional structure have a relatively poor uniformity. For the touch screen that supports passive pen and active pen, the touch effect will be greatly degraded.

Figure 11:
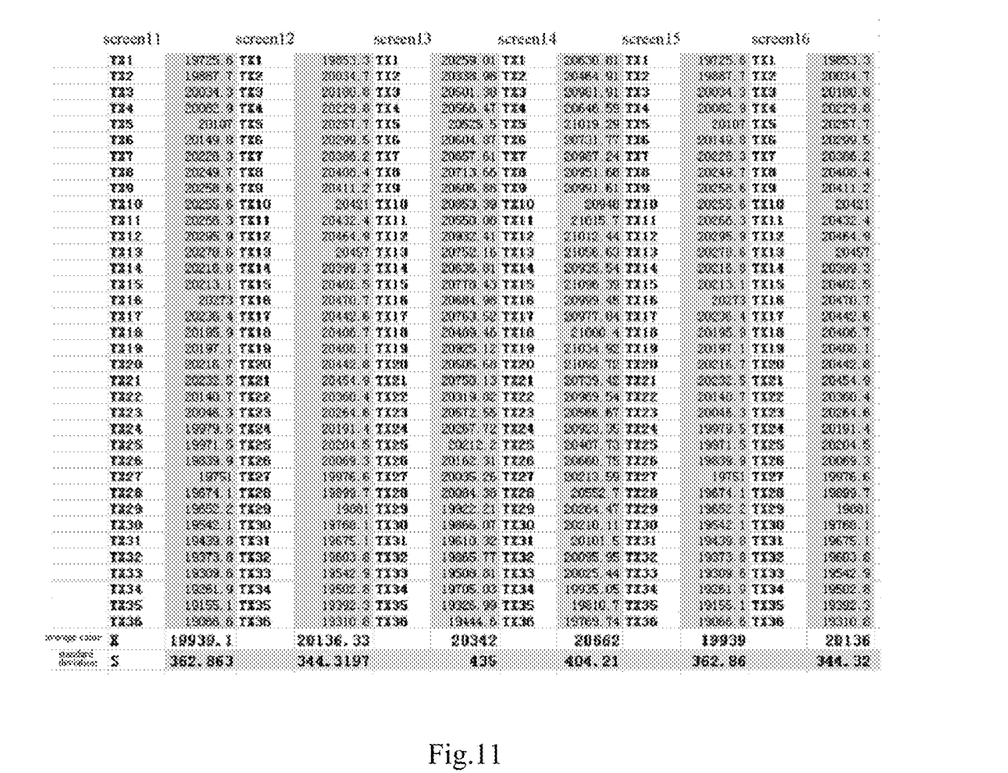
FIG. 11 is a schematic view of result of a test performed to a touch screen according to an embodiment of this disclosure.
Figure 12:
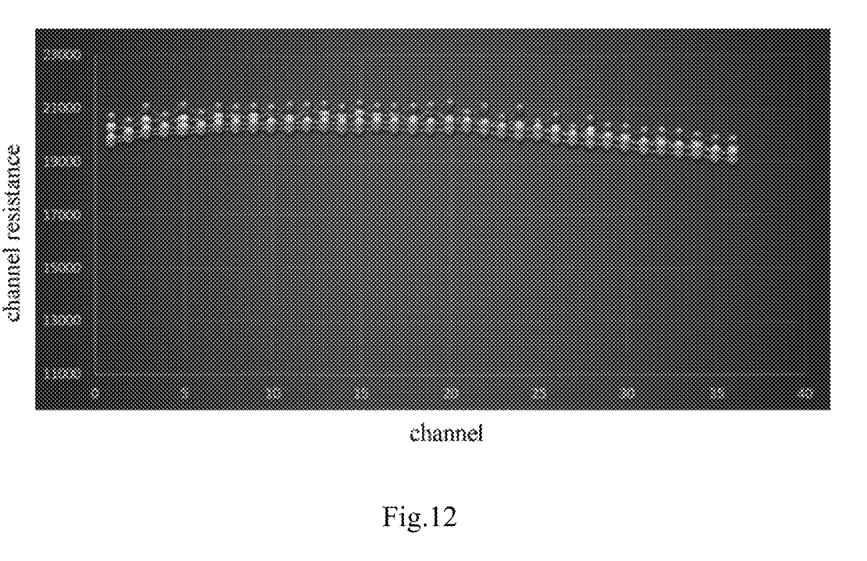
FIG. 12 is a representation diagram of data in FIG. 11.

Then, another test is performed to the touch screen according to an embodiment of this disclosure. The touch driving electrodes of the touch screen are connected with the touch driving circuit using the main signal lines. The channel resistances for the touch driving electrodes of six touch screens (screen 11-screen 16) are detected and analyzed, the results thereof are shown in FIG. 11 and FIG. 12. From the data as shown in FIG. 11 and the curve in FIG. 12, it can be seen that the difference between the maximum value and the minimum value of the channel resistances in the same touch screen does not exceed 6.05%. The standard deviation for each of the touch screens is relatively small, which is in the range of about 344-435. Therefore, the touch screen having the structure according to the embodiment of this disclosure has a better uniformity in the channel resistance. The touch screen according to the embodiment of this disclosure can reduce the difference between the channel resistances brought by signal line thinning effectively, and also have the effect of uniform channel resistance for the product with ultra-narrow frame and ultra-narrow linewidth. For the touch screen that supports active pen and passive pen, the design of the touch screen proposed by the embodiment of this disclosure can improve uniformity of the channel resistance in the touch screen effectively, which is favorable to transmitting operation signals for various pens, and to debugging of the touch IC (integrated circuit).

In addition, an embodiment of this disclosure further provides a display device, which comprises the substrate described above. The display device can be any product or component with the display function, such as notebook computer display screen, display, television, digital photo frame, mobile phone, panel computer etc.

The above embodiments are only used for explaining the disclosure rather than limiting the invention. The ordinary skilled person in the art can make various changes and modifications to the disclosure without departing from the spirit and the scope of the invention. Hence, all the equivalent technical solutions also belong to the scope of the invention. The protection scope of the invention shall be defined by the appended claims.

The invention claimed is:

1. A substrate, comprising:
a plurality of main signal line;
a touch driving circuit, and
a plurality of touch electrodes, the plurality of touch electrodes being connected with the touch driving circuit through the plurality of main signal lines, respectively,
wherein each of the plurality of main signal lines comprises a first segment and a second segment connected in series with the first segment, the second segment of each of the plurality of main signal lines is directly contact with a corresponding touch electrode of the plurality of touch electrodes,
wherein the first segment of each of the plurality of main signal lines is a single signal line, and first segments of the plurality of main signal lines are parallel with each other, the second segment of each of the plurality of main signal lines comprises a plurality of sub signal lines connected in parallel with one another, wherein the plurality of sub signal lines connected in parallel with one another forms a rectangular signal line area connected with the first segment of each of the plurality of main signal lines, such that a semi-enclosed region is defined by the first segment and a side of the rectangular signal line area close to the first segment,
wherein for any two main signal lines connecting with different touch electrodes of the plurality of touch electrodes, the second segment of the main signal line for connecting the touch electrode away from the touch driving circuit has more sub signal lines than the second segment of the main signal line for connecting the touch electrode close to the touch driving circuit, and wherein the first segment and the second segment of the main signal line for connecting the touch electrode close to the touch driving circuit are located within the semi-enclosed region defined by the first segment and the side of the rectangular signal line area close to the first segment of the main signal line for connecting the touch electrode away from the touch driving circuit.

2. The substrate according to claim 1, wherein each of the plurality of main signal lines comprises a plurality of second segments connected in series with one another.

3. The substrate according to claim 2, wherein for any two adjacent second segments in each of the plurality of main signal lines, the second segment away from the touch driving circuit has more sub signal lines than the second segment close to the touch driving circuit.

4. The substrate according to claim 3, wherein for any two adjacent second segments in each of the plurality of main signal lines, the second segment away from the touch driving circuit has two times as many sub signal lines as the second segment close to the touch driving circuit.

5. The substrate according to claim 1, wherein the plurality of touch electrodes comprises a plurality of touch driving electrodes, each touch driving electrode being connected with the touch driving circuit through at least one of the plurality of main signal lines.

6. The substrate according to claim 5, wherein for any two main signal lines connecting different touch driving electrodes, the main signal line for connecting the touch driving electrode away from the touch driving circuit has more sub signal lines than the main signal line for connecting the touch driving electrode close to the touch driving circuit.

7. The substrate according to claim 5, wherein the plurality of touch driving electrodes is divided into at least two groups of touch driving electrodes,
wherein, any two main signal lines for connecting different touch driving electrodes in a same group have a same number of sub signal lines, and
wherein, for any two main signal lines for connecting different touch driving electrodes in different groups, the main signal line for connecting the touch driving electrode away from the touch driving circuit has more sub signal lines than the main signal line for connecting the touch driving electrode close to the touch driving circuit.

8. The substrate according to claim 5, wherein each of two terminals of each touch driving electrode is connected with the touch driving circuit through one main signal line.

9. The substrate according to claim 1, wherein the plurality of touch electrodes comprises a plurality of touch sensing electrodes, each touch sensing electrode is connected with the touch driving circuit through at least one of the plurality of main signal lines.

10. The substrate according to claim 9, wherein for any two main signal lines connecting different touch sensing electrodes, the main signal line for connecting the touch sensing electrode away from the touch driving circuit has more sub signal lines than the main signal line for connecting the touch sensing electrode close to the touch driving circuit.

11. The substrate according to claim 9, wherein the plurality of touch sensing electrodes is divided into at least two groups of touch sensing electrodes,
wherein, for any two main signal lines for connecting different touch sensing electrodes in a same group have a same number of sub signal lines, and
wherein, for any two main signal lines for connecting different touch sensing electrodes in different groups, the main signal line for connecting the touch sensing electrode away from the touch driving circuit has more sub signal lines than the main signal line for connecting the touch sensing electrode close to the touch driving circuit.

12. The substrate according to claim 1, wherein each of the plurality of sub signal lines has a width of about 8 μm-30 μm.

13. The substrate according to claim 1, further comprising a base substrate, as well as a light shielding layer, a bridging layer, a first cover layer, a transparent conductive layer, a metal layer and a second cover layer arranged on the base substrate successively, wherein the transparent conductive layer comprises the plurality of touch electrodes, and the metal layer comprises the plurality of main signal lines.

14. A display device comprising the substrate according to claim 1.

15. The display device according to claim 14, wherein each of the plurality of main signal line comprises a plurality of second segments connected in series with one another.

16. The display device according to claim 15, wherein for any two adjacent second segments in each of the plurality of main signal lines, the second segment away from the touch driving circuit has more sub signal lines than the second segment close to the touch driving circuit.

* * * * *